US008188838B2

(12) United States Patent
Choi

(10) Patent No.: US 8,188,838 B2
(45) Date of Patent: May 29, 2012

(54) SLIDING KEY FOB

(75) Inventor: Dave Choi, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 713 days.

(21) Appl. No.: 12/273,900

(22) Filed: Nov. 19, 2008

(65) Prior Publication Data

US 2010/0123548 A1 May 20, 2010

(51) Int. Cl.
*G05B 19/00* (2006.01)

(52) U.S. Cl. .................. 340/5.64; 340/5.62; 340/572.8; 340/539.11

(58) Field of Classification Search .................. 341/176; 340/426, 5.22, 12, 5.64, 5.62, 572.8, 539.11
See application file for complete search history.

(56) References Cited

U.S. PATENT DOCUMENTS 4,041,258 A 8/1977 Harada
5,021,616 A 6/1991 Hardt
5,099,193 A 3/1992 Moseley et al.
5,237,264 A * 8/1993 Moseley et al. .............. 323/324
5,440,300 A * 8/1995 Spillman, Jr. .............. 340/10.34
5,949,401 A * 9/1999 Kazarian .................... 345/156
6,144,367 A * 11/2000 Berstis ...................... 345/158
D461,047 S * 8/2002 Peterson ..................... D3/208
6,528,740 B2 * 3/2003 Miyoshi ..................... 200/5 R
6,618,022 B2 * 9/2003 Harvey ....................... 343/876
7,057,122 B1 6/2006 Mizuno et al.
7,170,420 B2 * 1/2007 Phifer ....................... 340/12.55
7,439,850 B2 10/2008 Boulard et al.
7,453,346 B2 11/2008 Buccinna et al.
7,822,447 B2 * 10/2010 Kim .......................... 455/575.4
7,898,387 B2 * 3/2011 Jalil et al. .................. 340/5.64
2002/0008610 A1 1/2002 Peterson
2003/0231131 A1 12/2003 Dimig et al.
2004/0119687 A1 * 6/2004 Suzuki et al. ............... 345/156
2004/0140883 A1 7/2004 Jalil et al.
2004/0183671 A1 9/2004 Long
2004/0198437 A1 10/2004 Yamamoto et al.
2005/0012594 A1 1/2005 Shim
2006/0109080 A1 5/2006 Tang et al.
2006/0145810 A1 7/2006 Buccinna et al.
2006/0202881 A1 9/2006 Buccinna et al.
2007/0229301 A1 10/2007 Katz
2008/0029374 A1 2/2008 Christopher et al.
2008/0053804 A1 3/2008 Lai
2008/0211707 A1 * 9/2008 Park ........................... 341/176
2010/0123548 A1 5/2010 Choi

FOREIGN PATENT DOCUMENTS

CN 1012717925 A 9/2008
CN 201174345 Y 12/2008

OTHER PUBLICATIONS

Office Action of U.S. Appl. No. 12/574,331 dated Oct. 31, 2011.

* cited by examiner

*Primary Examiner* — Daniel Wu
*Assistant Examiner* — Rufus Point
(74) *Attorney, Agent, or Firm* — Rankin Hill & Clark LLP

(57) ABSTRACT

A sliding key fob includes a housing formed of a first housing member and a second housing member. A transmitter is disposed within the housing. A transmitter sends a first actuating signal when the first housing member is slidably moved in a first direction relative to the second housing member. The transmitter sends a second actuating signal when the first housing member is slidably moved in a second direction relative to the second housing member.

19 Claims, 9 Drawing Sheets

SLIDING KEY FOB

BACKGROUND

The present disclosure relates to vehicle key fobs, and particularly relates to a sliding or slide actuated key fob for a vehicle.

Currently all vehicle key fobs are button-based designs which require the user to press a button to remotely activate a function on a vehicle. For example, a common vehicle key fob includes a lock button, an unlock button, a trunk unlock/open button and a panic button. A user simply presses the appropriate button to activate a desired function (e.g., unlock vehicle doors).

One drawback of button-based key fobs is that the battery may become inadvertently drained due to prolonged accidental button presses. For example, the key fob may reside in a user's pocket or purse and may be situated such that one or more of its buttons are held in or repeatedly pressed unknowingly by the carrier. This can result in the battery of the key fob undesirably draining.

To deal with this drawback, some manufacturers employ a sliding door or openable cover that prevents the key fob's buttons from being pushed accidentally. However, these types of key fobs are more cumbersome to operate in that they require the user to first open the door or cover to reveal the buttons and then subsequently press one or more of the buttons to activate a function remotely on the vehicle. In addition to being relatively more cumbersome, this process of opening a door and then pressing a button is more time consuming.

SUMMARY

According to one aspect, a sliding key fob is provided. More particularly, in accordance with this aspect, the sliding key fob includes a housing formed of a first housing member and a second housing member. A transmitter is disposed within the housing. The transmitter sends a first actuating signal when the first housing member is slidably moved in a first direction relative to the second housing member. The transmitter sends a second actuating signal when the first housing member is slidably moved in a second direction relative to the second housing member.

According to another aspect, an improved key fob is provided for a vehicle. More particularly, in accordance with this aspect, the key fob includes a lower housing member and upper housing member secured to the lower housing member and slidably movable relative thereto. The upper housing member is slidably movable along a first axis to a first actuating position and slidably movable along a second axis to a third actuating position. The first axis is oriented approximately normal relative to the second axis. The key fob further includes a transmitter for transmitting actuating signals to an associated vehicle. The transmitter sends a first actuating signal when the upper housing is moved to the first actuating position and a second actuating signal when the upper housing is moved to the second actuating position.

According to still another aspect, a slide actuated key fob is provided. More particularly, in accordance with this aspect, the slide actuated key fob includes a first clamshell member and a second clamshell member. The first clamshell member is slidably movable in at least two directions relative to the first clamshell member. The transmitter is disposed between the first and second clamshell members. A transmitter sends a first actuating signal when the first clamshell member is moved in a first direction of the at least two directions and sends a second actuating signal when the first clamshell member is moved in a second direction of the at least two directions.

DETAILED DESCRIPTION

Figure 1:
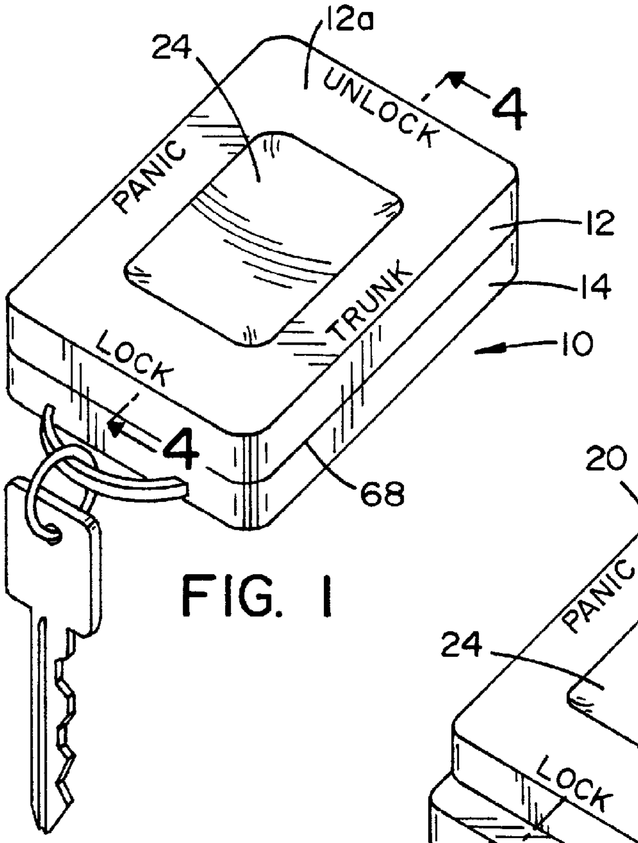
FIG. 1 is a perspective view of a sliding key fob formed of first and second housing members.
Figure 2:
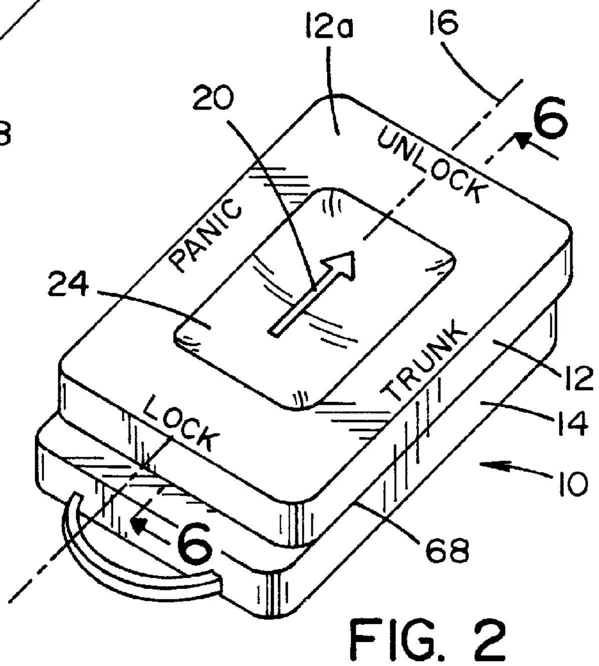
FIG. 2 is a perspective view of the sliding key fob with the first housing member slidably moved in a first direction relative to the second housing member along a first axis to a first actuating position to actuate a vehicle function.
Figure 3:
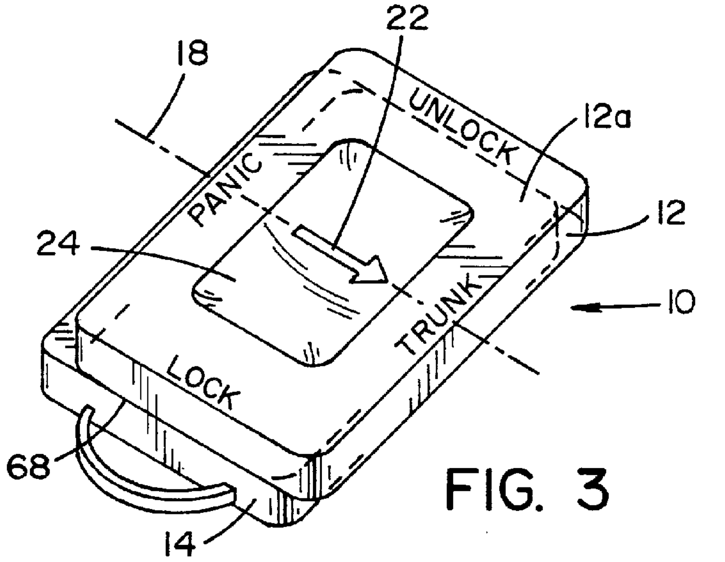
FIG. 3 is a perspective view of the sliding key fob with the first housing member slidably moved in a second direction relative to the second housing member along a second axis to a second actuating position to actuate another vehicle function.

Referring now to the drawings, wherein the showings are for purposes of illustrating one or more exemplary embodiments, FIGS. 1-3 illustrate a sliding or slide actuated key fob 10 for a vehicle. As shown, the key fob 10 includes a housing 12,14 formed of a first or upper housing member 12 and a second or lower housing member 14. More particularly, the first or upper housing member 12 is secured to the second or lower housing member 14 and is slidably movable relative thereto. In the illustrated embodiment, the first and second housing members are formed as first and second clam shell members, wherein the first clam shell member 12 is slidably movable in at least two directions relative to the second clam shell member 14.

More particularly, in the illustrated embodiment, the upper housing member 12 is slidably movable along a first axis 16 (as shown in FIG. 2) to a first actuating position and slidably movable along a second axis 18 (as shown in FIG. 3) to a second actuating position. The upper housing member 12 is also slidably movable along the first axis 16 to a third actuating position and slidably movable along the second axis 18 to a fourth actuating position. The first axis 16 of FIG. 2 is oriented approximately normal or perpendicular relative to the second axis 18 of FIG. 3 in the illustrated embodiment. As will be described in more detail below, each of the actuating positions (e.g., first, second, third and fourth actuating positions) can be used to transmit a corresponding actuating signal to a vehicle for purposes of actuating a particular vehicle function (i.e., each position corresponds to a specific vehicle function).

For example, as shown in FIG. 2, the upper member 12 can be moved along the first axis 16 in a first direction as indicated by arrow 20 to or toward the first actuating position to transmit a first signal to the vehicle for actuating a first vehicle function, such as an unlock doors function. In FIG. 3, the upper member 12 is shown being moved to or toward the second actuating position along axis 18 in the direction of arrow 22 to transmit a second actuating signal to a vehicle corresponding to a second vehicle function, such as an open trunk function. Moving the upper housing 12 along axis 16 in a direction opposite arrow 20 to the third actuating position could be used to transmit a third actuating signal to actuate a third vehicle function, such as locking the vehicle's doors. Similarly, the upper member 12 could be moved along axis 18 in a direction opposite arrow 22 to the fourth actuating position to send a fourth actuating signal to the vehicle for actuating a fourth vehicle function, such as a panic function. As will be readily appreciated by those skilled in the art, the housing 12,14 is advantageously button-less (i.e., does not include buttons that require depression for actuation) and instead uses a sliding movement to actuate particular vehicle functions. The upper housing member 12 includes a recess or depression 24 appropriately sized for receiving a user's finger and enabling the user to slidably move the upper housing member 12 relative to the lower housing member 14.

Figure 4:
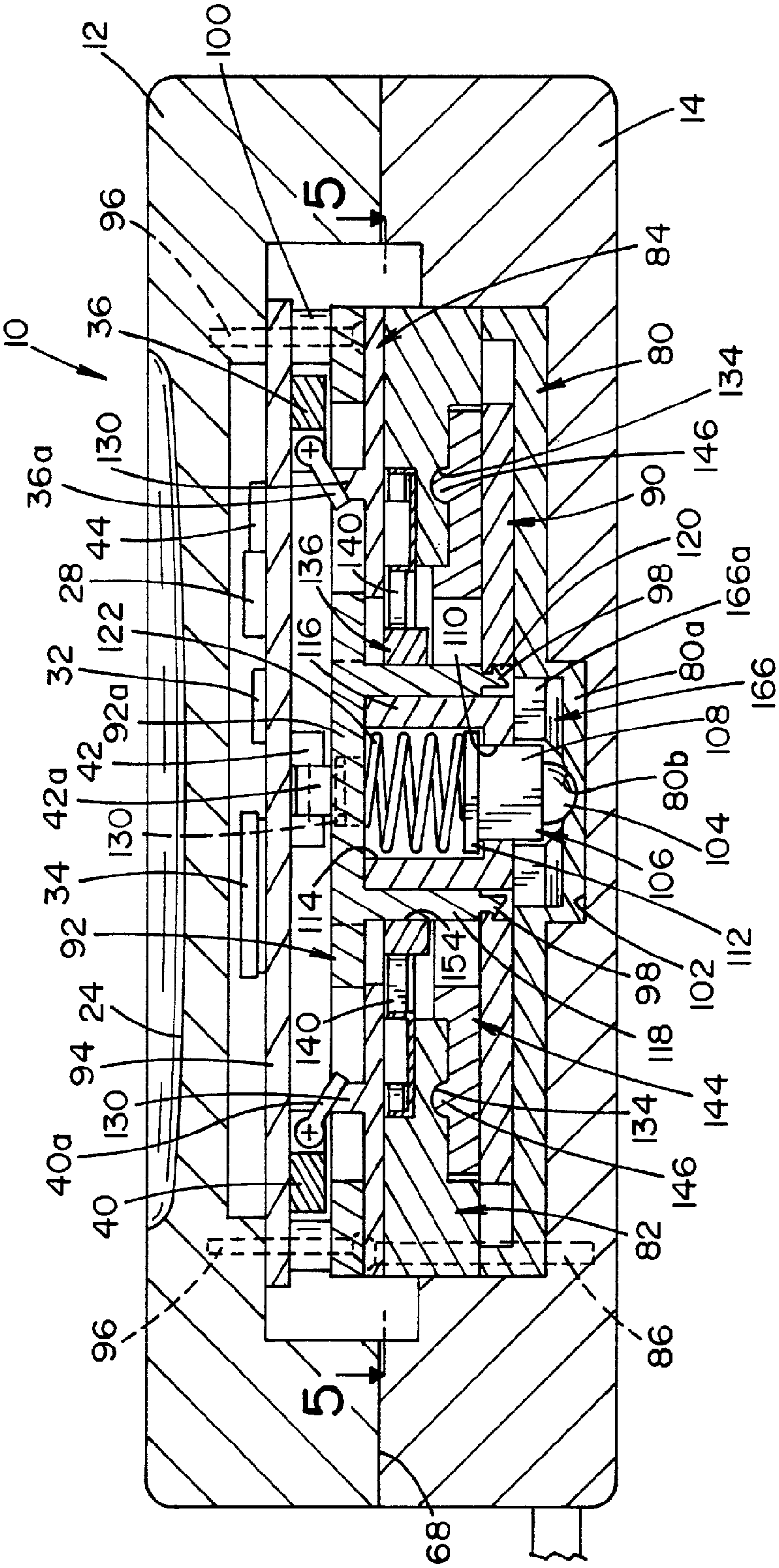
FIG. 4 is a cross-sectional view of the key fob taken along the line 4-4 of FIG. 1.
Figure 11:
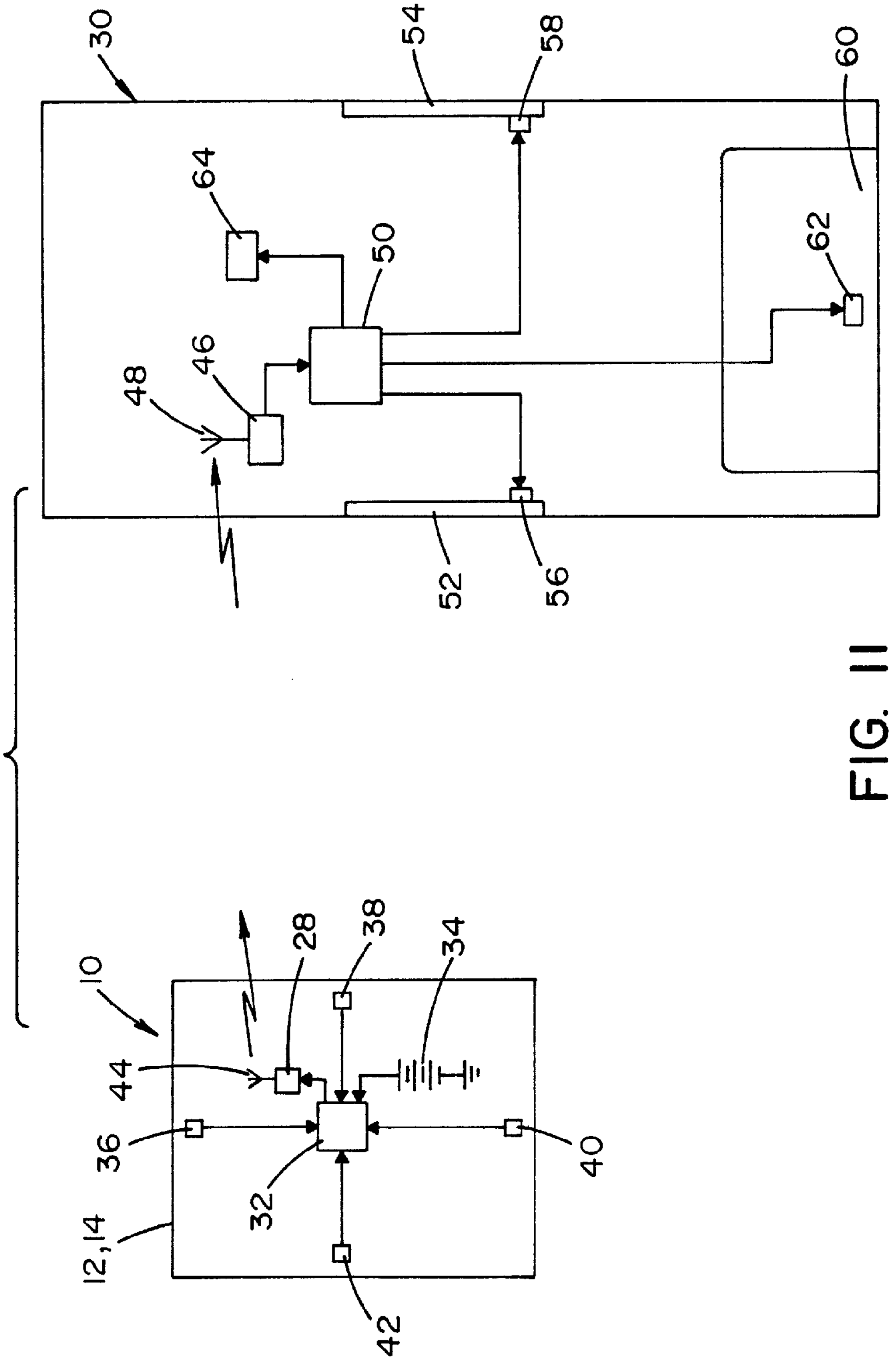
FIG. 11 is a schematic view of a sliding key fob and a vehicle to which the sliding key fob corresponds.

With reference to FIGS. 4 and 11, a transmitter 28 can be disposed within the housing 12,14, such as between the first and second members 12,14, for transmitting actuating signals to a vehicle 30 (e.g., the first, second, third and fourth actuating signals). The key fob 10 can further include a controller 32 operatively connected to the transmitter 28 and powered by a battery 34. A plurality of micro-switches 36,38,40,42 can also be disposed within the key fob 10 for indicating when the upper housing 12 is moved to one of its actuating positions. The transmitter 28 can send, via antenna 44, a first actuating signal when the first housing member 12 is slidably moved in the first direction (e.g., the direction of arrow 20) relative to the second housing member 14 to the first actuating position of FIG. 2. The transmitter can also send a second actuating signal when the first housing member 12 is slidably moved in a second direction (e.g., the direction of arrow 22) relative to the second housing member 14 to the second actuating position of FIG. 3. Likewise, the transmitter 28 can send the third and fourth actuating signals via the antenna 44 when the first housing member 12 is slidably moved relative to the second housing member 14 to, respectively, the third and fourth actuating positions.

More particularly, as will be described in more detail below, the first micro-switch 36 can be triggered or actuated when the first housing member 12 is moved along axis 16 in the direction of arrow 20 to the first actuating position of FIG. 2 and the second micro-switch 38 can be triggered or actuated when the first housing member 12 is moved along axis 18 in the direction of arrow 22 to the second actuating position of FIG. 3. The third micro-switch 40 can correspond to the third actuating position, which is achieved by moving the first housing member 12 along axis 16 in a direction opposite arrow 20, and the fourth micro-switch 42 can correspond to the fourth actuating position, which can be achieved by moving the first housing member 12 along axis 18 in a direction opposite arrow 22. Triggering or actuating of the micro-switches 40,42 can, respectively, be used by the controller 32 to send third and fourth actuating signals via the transmitter 28 to the vehicle 30.

The controller 32 directs the transmitter 28 to send the first actuating signal when the first micro-switch 36 is actuated by the first housing member 12 being moved into the first actuating position. The controller 32 directs the transmitter 28 to send the second actuating signal when the second micro-switch 38 is actuated by the first housing member being moved into the second actuating position. The controller 32 directs the transmitter 28 to send the third actuating signal when the third micro-switch 40 is actuated by the first housing member 12 being moved into the third actuating position. The controller 32 directs the transmitter 28 to send the fourth actuating signal when the fourth micro-switch 42 is actuated by the first housing member 12 being moved into the fourth actuating position.

A receiver 46 on the vehicle 30 having antenna 48 can receive the actuating signals from the key fob 10 and deliver the same to an onboard controller 50. The onboard controller 50, which can be powered by the vehicle's battery, can process the actuating signals and use the same for operating corresponding functions of the vehicle 30. For example, the controller 50 can process the first actuating signal to unlock the vehicles doors 52,54 via unlock/locking mechanisms 56,58. The second actuating signal can be processed by the onboard controller 50 to unlock and open the vehicle's trunk 60 via trunk latch mechanism 62. The third actuating signal can be processed by the onboard controller 50 to lock the vehicle doors 52,54 via the unlocking/locking mechanisms 56,58. Also, the fourth actuating signal can be processed by the onboard controller 50 to initiate a panic alarm, such as through the vehicle's horn and/or lights, or other noise and/or light generating devices 64. Of course, fewer or more actuating signals and corresponding functions could be used and the function could vary from the illustrated embodiment.

In the illustrated embodiment, the first actuating signal is transmitted when the first housing member 12 is slidably moved from a non-actuating rest position (i.e., the position illustrated in FIG. 1) in a first direction, such as the direction indicated by arrow 20, along first axis 16 to the first actuating position (the position illustrated in FIG. 2). A second actuating signal is transmitted when the first housing member 12 is slidably moved from the non-actuating rest position of FIG. 1 in the second direction, such as the direction indicated by arrow 22, along axis 18 to the second actuating position (the position illustrated in FIG. 3). The axes 16,18 and the first and second directions 20,22 are approximately normal relative to one another in the illustrated embodiment.

A third actuating signal is transmitted when the first housing member 12 is slidably moved from the non-actuating rest position in a third direction (e.g., a direction opposite that indicated by arrow 20) to a third actuating position along the axis 16. The first and third directions are opposite one another along axis 16. A fourth actuating signal is transmitted when the first housing member 12 is slidably moved from the non-actuating rest position in a fourth direction (i.e., a direction opposite arrow 22) along axis 18 to a fourth actuating position, the fourth direction being opposite the second direction along the axis 18. Of course, the directions need not be limited to those employed in the illustrated embodiment.

As shown in FIGS. 1-3, sliding movement in the first, second, third and fourth directions occurs in a single plane. More specifically, the first, second, third and fourth directions are disposed along a plane defined by an interface 68 formed between the first and second housing members 12,14 and thus sliding movement of the upper housing 12 relative to the lower housing 14 is restricted to a single plane. In contrast to prior art button-based key fobs, the sliding movement of key fob 10 occurs in a plane parallel to a face 12*a* of the key fob. Prior art button-based key fobs would generally require depression of a button downward into the face 12*a* (i.e., orthogonal relative to the single plane of key fob 10).

Figure 5:
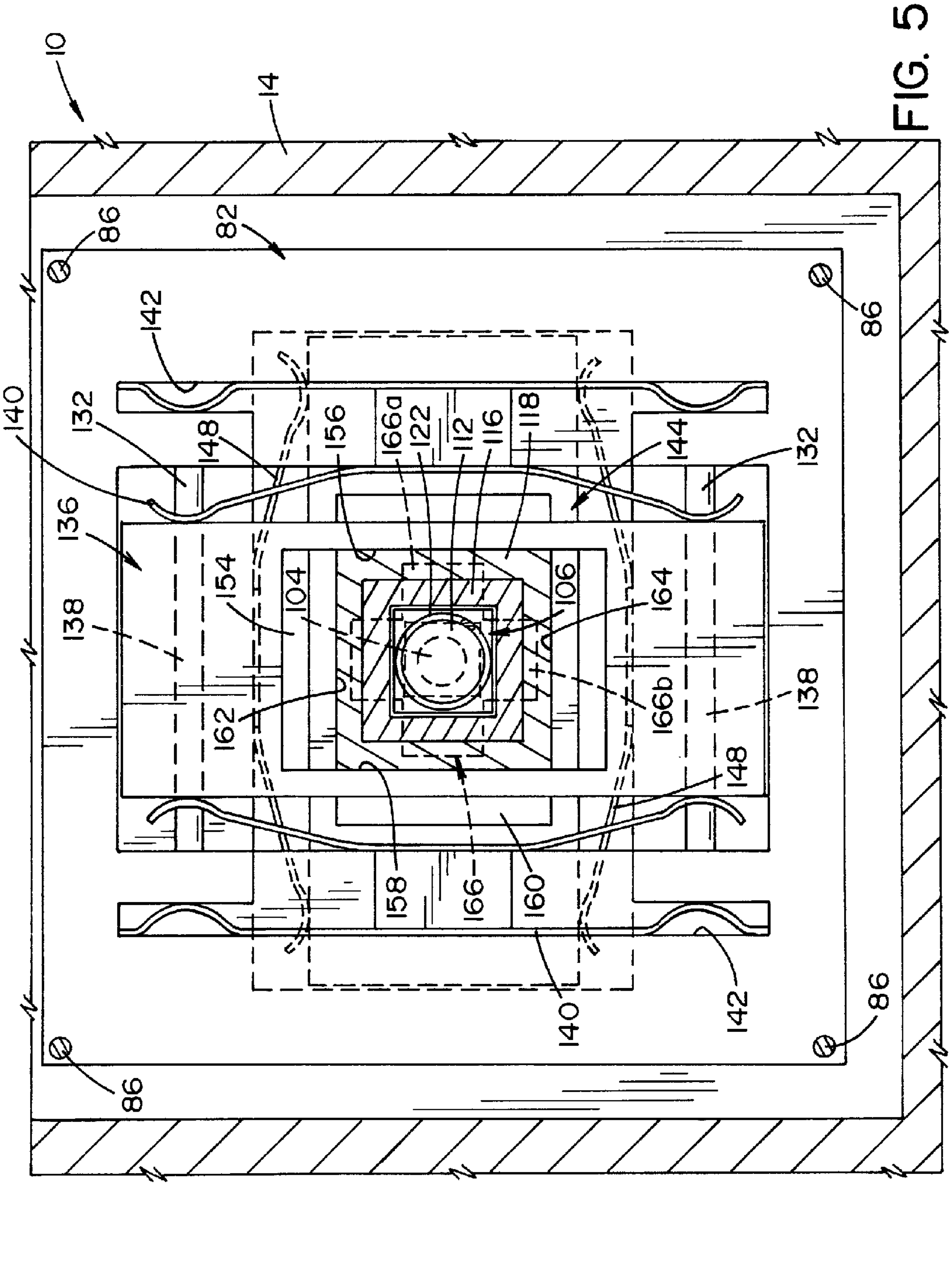
FIG. 5 is a cross-sectional view of the key fob taken along the line 5-5 of FIG. 4.
Figure 8:
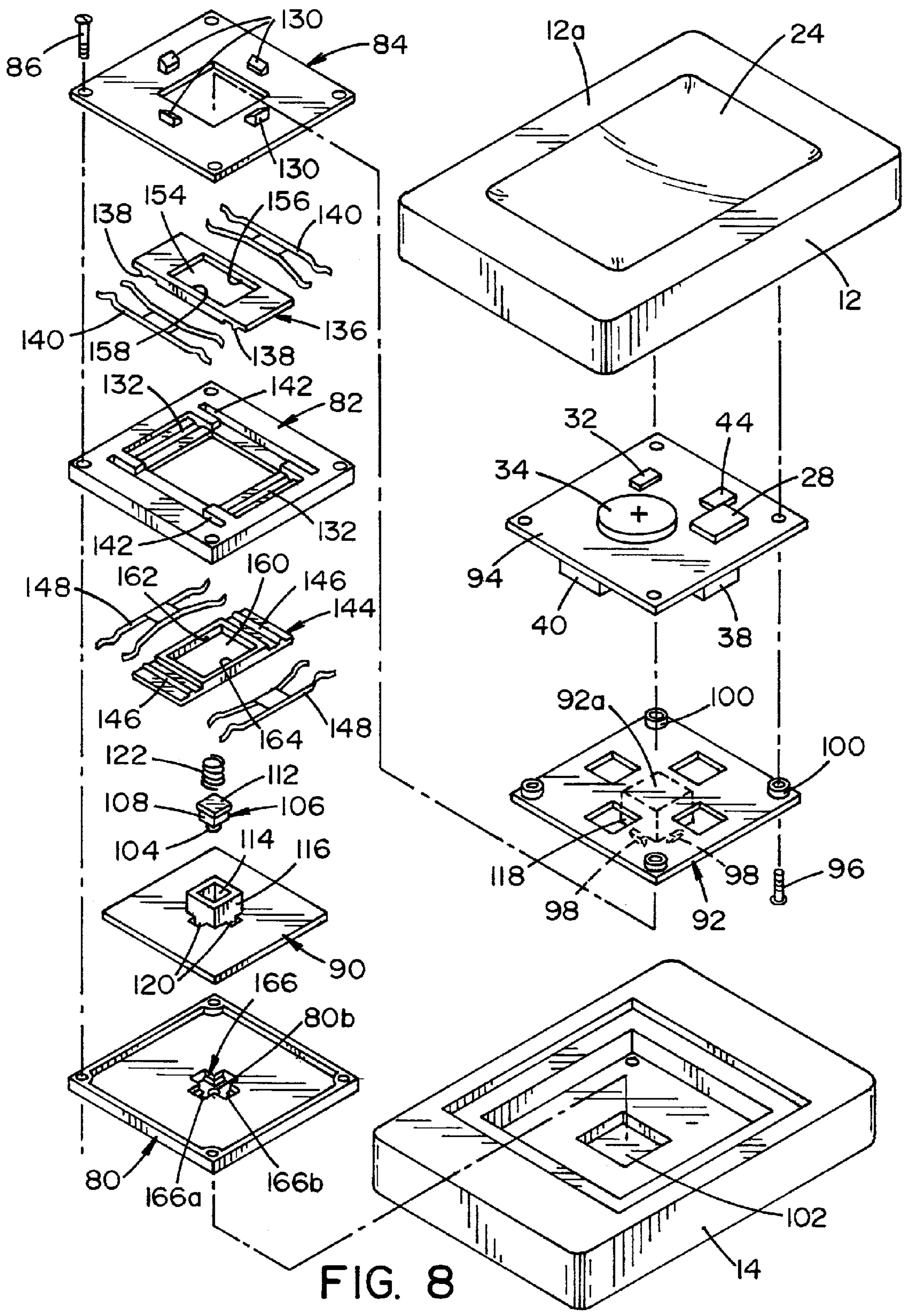
FIG. 8 is an exploded view of the key fob of FIG. 1.

With reference to FIGS. 4, 5 and 8, a base 80, an intermediate member 82 and a cover 84 are secured to the lower housing member 14 via one or more fasteners, such as screws

86. Alternatively, at least the base 80 can be integrally formed with the lower housing member 14. Secured to the upper housing member 12 are an upper housing base 90, an upper housing intermediate member 92 and a printed circuit board (PCB) or substrate 94. In the illustrated embodiment, the PCB 94 is sandwiched between the intermediate member 92 and the upper housing member 12, which are held together via one or more fasteners, such as screws 96. As shown, the upper housing base 90 can be secured to the upper housing intermediate member 92 via resilient clips 98. Standoffs or bosses 100 formed integrally with the intermediate member 92 space the intermediate member 92 from the PCB 94.

The lower housing member 14 includes a recess 102 which cooperatively receives a lower portion **80*a* of the base 80. The lower portion 80*a* defines a semi-spherical recess 80*b* (FIG. 4) in which a ball portion 104 of ball member 106 is removably received when the upper housing member 12 is in its rest or non-actuating position of FIG. 1. The upper housing member 12 includes the ball member 106 operatively connected thereto for sliding movement therewith. More particularly, a cube-shaped main body 108 of the ball member 106 is cooperatively received through an aperture 110 defined through lower housing base 90. A head portion 112 of the ball member 106, which is greater in size than the aperture 110, is cooperatively received within a recess 114 defined by walls 116 extending upwardly from the base 90. The upper housing intermediate member 92 includes downwardly depending walls 118 which wrap around or enclose the walls 116 when the upper housing base 90 is snapped together to the upper housing intermediate member 92. As shown, the resilient clips 98 can be formed by distal ends of the walls 118 and a shoulder portion defined in clip recesses 120 adjacent the walls 116. The upper housing intermediate member 92 can also sandwich a spring 122 between the head portion 112 of the ball member 106 and a central wall portion 92*a* of the intermediate member 92. The spring 122 urges the ball portion 104 of the ball member 106 in the shaped recess 80*b* of the lower housing base 80** for reasons that will be described in more detail below.

The micro-switches 36,38,40,42 are disposed on an underside of the PCB 94. These micro-switches 36,38,40,42 are selectively actuated by raised ramp portions 130 of the lower housing cover 84. More particularly, the lower housing cover 84 includes a raised ramp portion 130 corresponding to each of the micro-switches 36-42. In the illustrated embodiment, the micro-switches 36,38,40,42 have pivotally disposed actuator arms **36*a*,38*a*,40*a*,42*a* on the underside of the PCB 94 and hang in a non-actuated position. Engagement and movement by the corresponding raised ramp structure 130 pivots the pivotally disposed actuator arms 36*a*,38*a*,40*a*,42*a* corresponding to micro-switches 36,38,40,42 to actuate the same. Other electrical components of the key fob 10 can also be disposed on the PCB board 94, such as the controller 32, the transmitter 28, the battery 34, and/or the antenna 44**.

The lower housing intermediate member 82 defines a pair of tracks, including a first track defined on an upper side of the intermediate member 82 and a second track defined on an underside of the intermediate member 82. More particularly, the first track defined in the upper side of the intermediate member 82 is formed by grooves 132 that extend in a direction parallel to the first axis 16. The second track defined in the lower side of the intermediate member 82 is formed by underside grooves 134 that extend in a direction parallel to the second axis 18.

Riding in the first track grooves 132 is a first sliding mechanism 136. The first sliding mechanism includes ribs 138 that are received within the grooves 132 for guided movement therealong. A first biasing mechanism, such as the illustrated leaf springs 140, are secured within slots 142 defined on the upper side of the intermediate member 82 for urging the first sliding mechanism 136 (and the upper housing member 12) to the rest, non-actuating position. A second sliding mechanism 144 has ribs 146 received in the underside grooves 134 for guided sliding movement therealong. A biasing mechanism, such as illustrated leaf springs 148, urges the second sliding mechanism 144 (and the upper housing member 12) to the rest, non-actuating position. The springs 148 can be received within corresponding slots (not shown) defined in an underside of the intermediate member 82. The first track and its grooves 132 and the second track and its grooves 134 both guide sliding movement of the first housing member 12 relative to the second housing member 14, as will be described in more detail below, and prevent relative rotation between the first housing member 12 and the second housing member 14.

The springs 140 (together comprising a biasing mechanism) urge the first sliding mechanism 136 to a central position along the track defined by the grooves 132. As shown, the first sliding mechanism 136 includes an aperture 154 through which the walls 116 and 118 of the upper housing base 90 and intermediate member 92 are received. Side walls 156,158 forming the aperture 154 abut corresponding side walls 118. As such, any movement of the sliding mechanism 136 along the track (defined by grooves 132) will cause the upper housing member 12, as well as the components 90,92,94 secured thereto, to move along the axis 16 guided by the track grooves 132. The springs 140 function to urge the upper housing 12 to its non-actuating, rest position along the axis 16 (i.e., the position between the first and third actuating positions).

In a similar fashion, the second sliding mechanism 144 has an aperture 160 defined therethrough. Side walls 162,164 of the aperture 160 abut the walls 118 such that movement of the second sliding mechanism 144 along the track grooves 134 will cause the upper housing member 12, and the components 90,92,94 secured thereto, to move along the axis 18 relative to the lower housing member 14 (i.e., between the second and fourth actuating positions). Thus, the springs 148 function to urge the upper housing member 12 to its non-actuating, rest position between the second and fourth actuating positions.

The lower portion **80*a* of the base 80 defines a cross-shaped aperture 166 in which the ball member 106 is movable. More particularly, a first portion or arm 166*a* of the cross-shaped aperture 166 is defined in parallel with the first axis 16 and a second portion or arm 166*b* of the cross-shaped aperture 166 is defined in parallel with the second axis 18. When the first housing member 12 is moved relative to the second housing member 14, the ball member 106 is moved by the walls 116 along with the upper housing member 12. As best seen in FIG. 4, movement of the ball member 106 along the cross portions 166*a* or 166*b* requires the head portion 112 of the ball member 106 to overcome the urging of the spring 122, which continuously urges the ball member 106, and particularly the ball portion 104, to a rest position wherein the ball portion 104 is received in the ball-shaped recess 80*b*. Once moved along one of the arms 166*a* or 166*b*, the ball member 106 is prevented from moving into the other of the arms 166*a* or 166*b*, which prevents simultaneous movement of the upper housing member 12** toward two actuating positions.

Through this arrangement, the ball member 106 is connected for movement with the first housing member 12 and the ball recess or detent **80*b* is defined as part of the lower housing member 14 (i.e., the recess 80*b* is particularly defined in the lower housing base 80, which is secured via screws 86 to the lower housing member 14). The ball member 106 is movable relative to the detent or recess 80*b* when the first housing member 12 is moved relative to the second housing member 14 to provide tactile feedback to the user. Accordingly, the ball portion 104 of the ball member 106 is received within the recess 80*b* when the upper housing 12 is in its non-actuating rest position; however, the ball portion 104 is moved out of the recess 80*b* when the upper housing 12 is moved into one of the actuating positions (e.g., the first, second, third or fourth actuating positions), but continuously urged back into the recess 80*b* by the spring 122. Alternatively, though not illustrated, the ball member 106 could be connected to the second housing member 14 and a detent or recess like recess 80*b* could be defined or connected to a component of the first housing member 12**.

Figure 6:
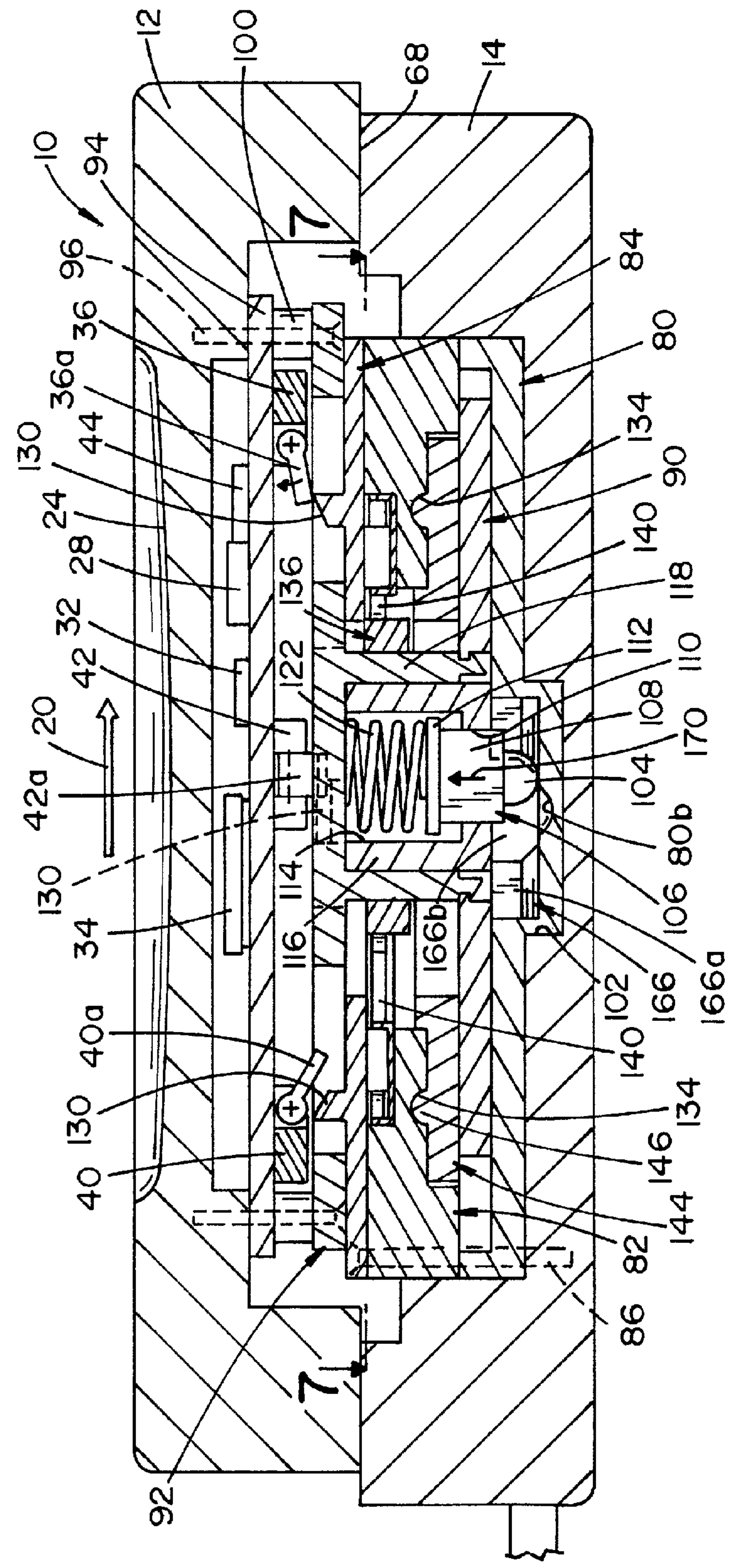
FIG. 6 is a cross-sectional view of the key fob taken along the line 6-6 of FIG. 2.

With reference now to FIG. 6, operation of the slide actuated key fob 10 will be described by way of example. More particular, FIG. 6 illustrates the upper housing member 12 being moved relative to the lower housing member 14 to the first actuating position along axis 16 and the direction of arrow 20. To effect this movement, a user would place his or her thumb or finger in the depression 24 to slide the upper housing member 12 relative to the lower housing member 14. In moving the upper housing member 12 relative to the lower housing member 14, the track grooves 132 would guide movement of the upper housing member 12 along the axis 16 and prevent relative rotation between the upper housing member 12 and the lower housing member 14.

Figure 7:
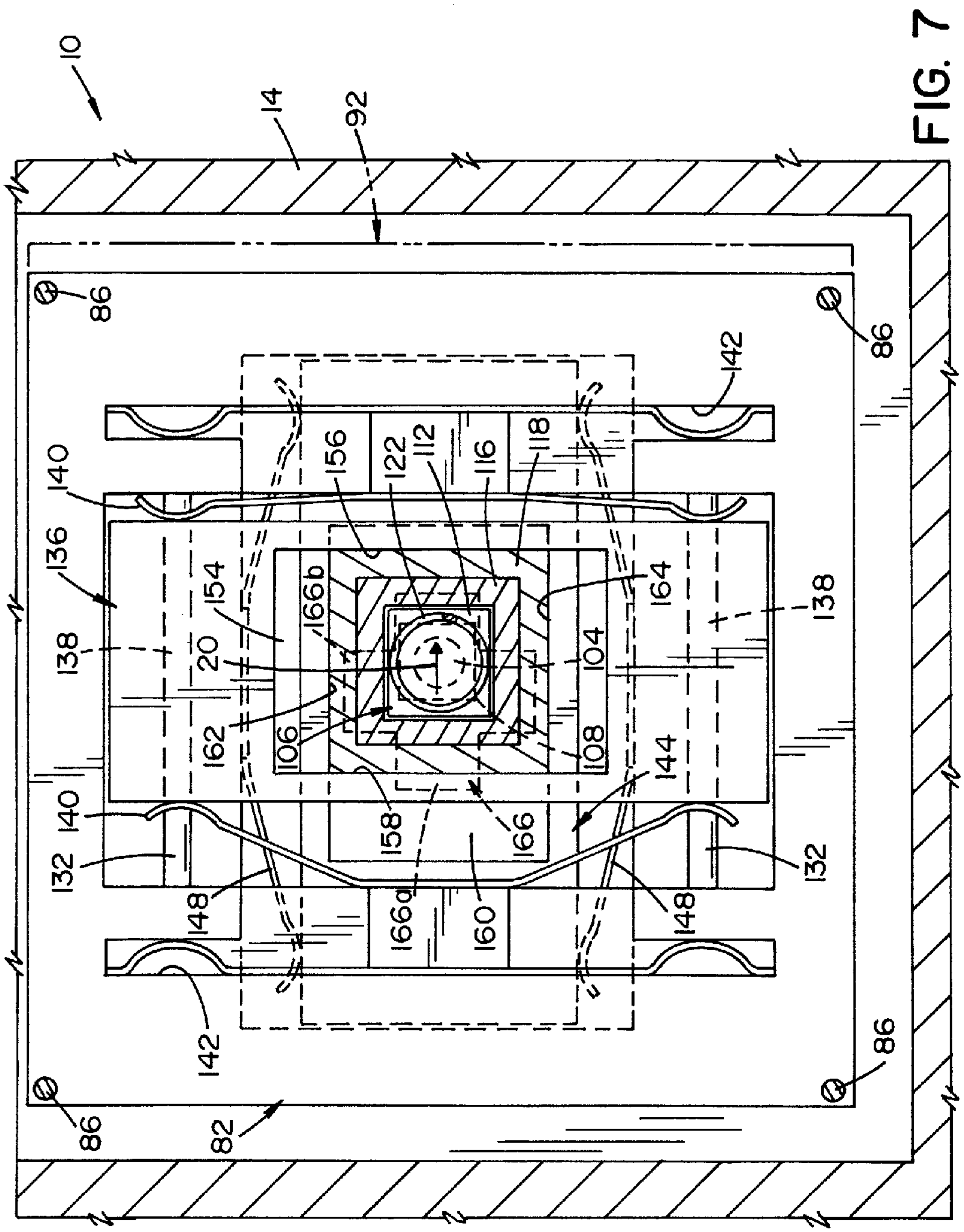
FIG. 7 is a cross-sectional view of the key fob taken along the line 7-7 of FIG. 6.

With additional reference to FIG. 7, movement of the upper housing member 12 would require the first slide mechanism 136 to overcome the urging of the spring 140 disposed in the direction of the first actuating position (i.e., the spring 140 on the right side of FIG. 7). Likewise, such movement of the upper housing member 12 relative to the lower housing member 14 would require the user to overcome the urging of the spring 122 against the ball member 106. That is, the movement of the upper housing member 12 to the first actuating position would require the ball member 106 to move in the direction of arrow 170 (see FIG. 6) thereby compressing the spring and causing the ball portion 104 to move out of the detent or ball recess **80*b*. Such movement of the ball member 106 would provide tactile feedback to the user that the upper housing member 12 is no longer in its non-actuating, rest position. In addition, the cross-shaped aperture 166 would limit movement to the axis 16 once the ball member 106 begins movement in first arm portion 166*a*. As the upper housing member 12 moves toward the first actuating position, the raised ramp portion 130 associated with the first actuating position micro-switch 36 would cause the first micro-switch arm 36*a* to pivot (i.e., actuate the arm 36*a*). The controller 32 would then issue a first actuating signal, such as an unlock signal, through the transmitter 28 and antenna 44 to the vehicle 30 so that the onboard controller 50 could take appropriate action (e.g., unlock the doors 52,54 via the mechanisms 56,58**).

When the user would release the upper housing member 12 by removing his or her thumb or finger from the recess 24, the same spring 140 would urge the upper housing member 12 via the first sliding mechanism 136 back to the rest, non-actuating position. At the same time, the spring 122 would urge the ball member 106 back to its rest position wherein the ball portion 104 would again be received in the recess **80*b*. This again would provide tactile feedback to the user that the upper housing member 12 has returned to its rest position. Movement of the upper housing member 12 to the third actuating position would occur in the same way but would be against the other spring 140. In a similar manner, movement of the upper housing member 12 along the axis 18 to either of the second or fourth actuating positions would occur in the same way, except that the second sliding mechanism 144 would need to overcome the urging of the appropriate spring 148**.

Figure 9:
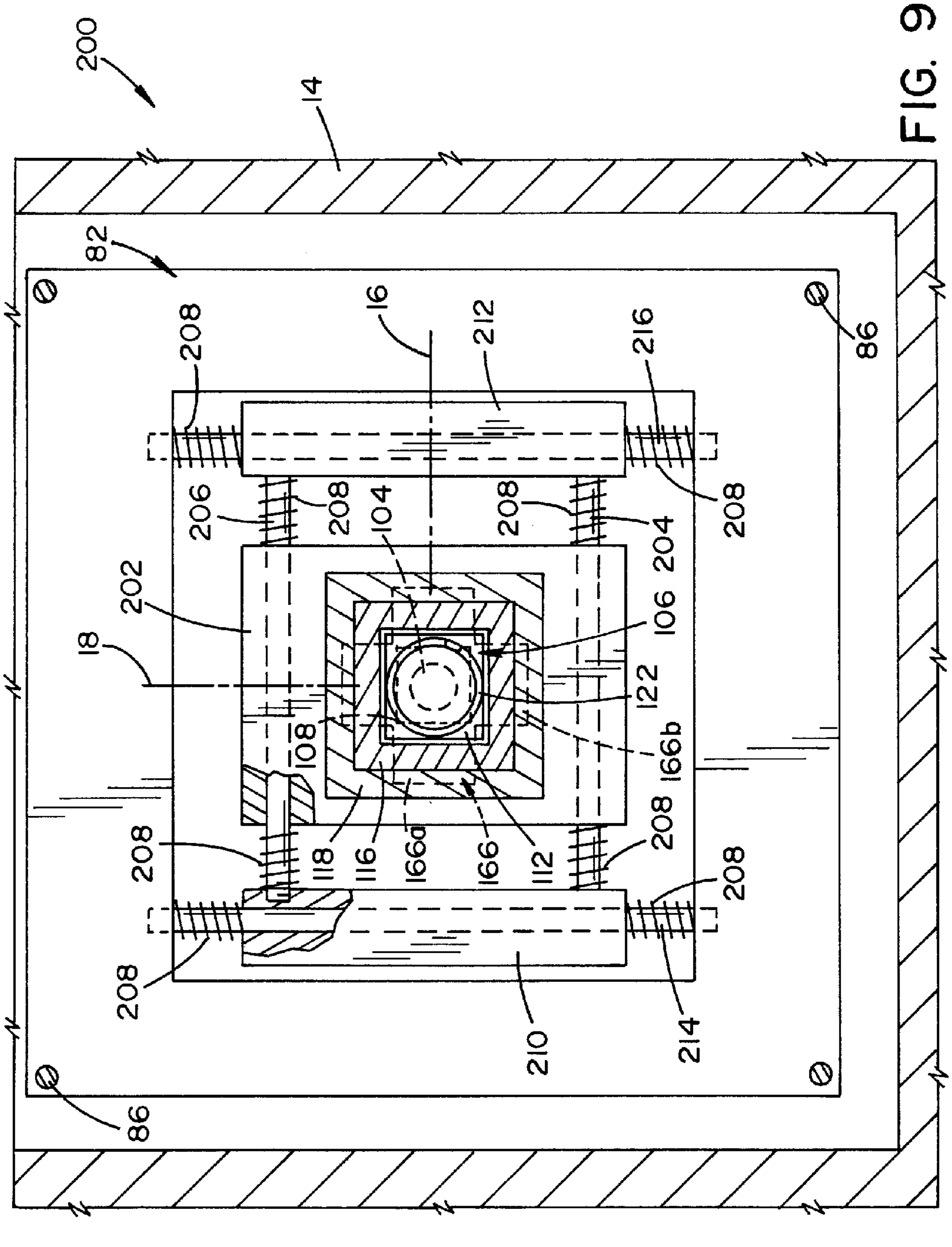
FIG. 9 is a schematic cross-sectional view of an alternate sliding key fob.

With reference now to FIG. 9, a sliding key fob 200 is illustrated according to an alternative embodiment. Except as indicated, the sliding key fob 200 is constructed like the key fob 10 and like reference numerals are used to refer to like components. More particularly, in FIG. 9, the key fob 200 includes a single slider 202. The slider 202 is disposed on rails 204,206 that could be parallel to a first axis, like axis 16. Instead of leaf springs, compression springs 208 flank the slider 202 on the rails 204,206 and urge the slider 202 to a rest position between first and third actuating positions. The rails 204,206 could have their distal ends secured into rail guide members 210,212. These rail guide members 210,212 can be disposed on rails 214,216 which could be parallel to a second axis, such as axis 18, for guiding sliding movement between second and fourth actuating positions. Compression springs 208 could be disposed on the rails 214,216 flanking either end of each of the rail guide members 210,212 for urging the rail guide members 210,212 and thus the slider 202 to the rest, non-actuating position between the second and fourth actuating positions. In most other respects, the slide actuated key fob 200 could operate like the key fob 10.

Figure 10:
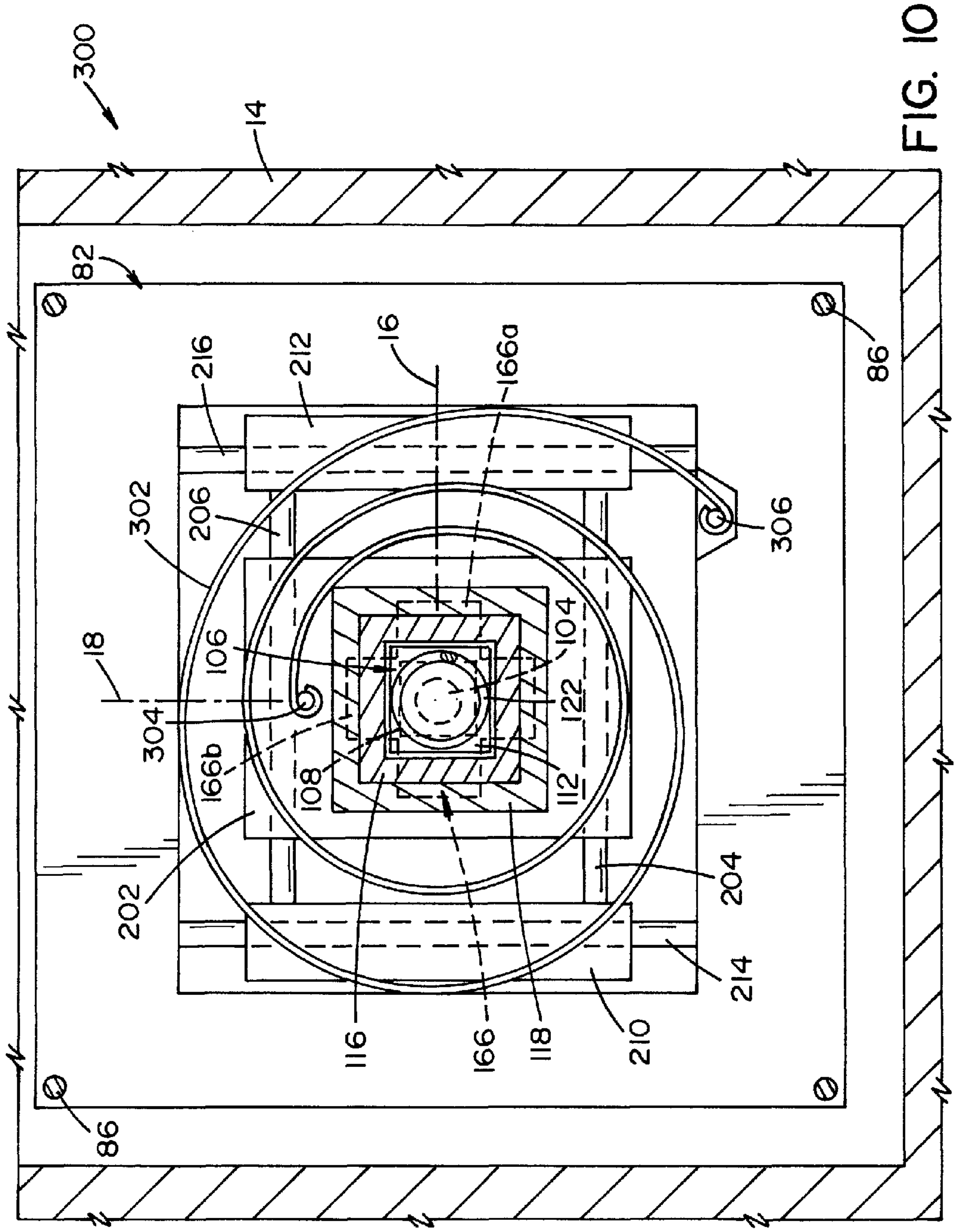
FIG. 10 is a schematic cross-sectional view of another alternate sliding key fob.

With reference to FIG. 10, another slide actuated key fob 300 is illustrated. Except as indicated, the sliding key fob 300 is constructed like the key fob 200 and like reference numerals are used to refer to like components. Instead of compression springs 208, the key fob 300 employs a single coil spring 302 for urging an upper housing member (not shown in FIG. 10) toward a non-actuating rest position relative to a lower housing member 14. In particular, one end **302*a* of the coil spring 302 (i.e., the more centrally positioned end) is fixedly secured to a central portion of the upper housing by anchor pin 304. Alternatively, the end 302*a* could be secured to one of the walls 118 or some other portion of the movable, upper housing member. The second or other end 302*b* of the coil spring is fixedly secured to the lower housing member 14 at a location radially spaced relative the location at which the end 302*a* connects to the upper housing member (at least when the upper housing member is in its non-actuating or rest position). Like the end 302*a*, the end 302*b* can be secured to the lower housing member 14 by an anchor pin, such as shown in FIG. 10**, or through some other type of connection.

An outer coil portion **302*c* engages or abuts a wall or walls (e.g., walls 308 in FIG. 10) of the lower housing 14 defining a recess in which the spring 302 is received. This arrangement allows the upper housing to move relative to the lower housing 14 while being urged towards its rest position by the spring 302 and relative rotation between the upper and lower housing members is prevented. In most other respects, the slide actuated key fob 300 operates and/or functions like the key fob 200. As a further alternative, though not illustrated, the coil spring 302 could be employed in the key fob 10 in place of the spring urged sliders or sliding mechanisms 142, 144**.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A sliding key fob, comprising:

a housing formed of a first housing member and a second housing member, the first housing member slidably moveable in first and second directions relative to the second housing member;

a transmitter disposed within said housing, said transmitter arranged in said housing and configured to send actuation signals when said first housing member is moved relative to said second housing member, said transmitter sending a first actuating signal when said first housing member is slidably moved in the first direction relative to said second housing member, said transmitter sending a second actuating signal when said first housing member is slidably moved in the second direction relative to said second housing member, wherein said first and second directions are substantially perpendicular relative to one another.

2. The sliding key fob of claim 1, wherein said first actuating signal is transmitted when said first housing member is slidably moved from a non-actuating rest position in said first direction to a first actuating position, and said second actuating signal is transmitted when said first housing member is slidably moved from said non-actuating rest position in said second direction to said second actuating position.

3. The sliding key fob of claim 1, wherein said first and second directions are opposite one another.

4. The sliding key fob of claim 2, wherein said housing further includes:

a first micro-switch, a second micro-switch and a controller operatively connected to said first and second micro-switches and said transmitter, said controller directing said transmitter to send said first actuating signal when said first micro-switch is actuated by said first housing member being moved into said first actuating position, said controller directing said transmitter to send said second actuating signal when said second micro-switch is actuated by said first housing member being moved into said first actuating position.

5. The sliding key fob of claim 2 further including a bias mechanism urging said first housing member toward said rest position.

6. The sliding key fob of claim 1, wherein said first housing member is slidably moveable in third and fourth directions relative to the second housing member, and wherein said transmitter sends a third actuating signal when said first housing member is slidably moved in a third direction relative to said second housing member and said transmitter sends a fourth actuating signal when said first housing member is slidably moved in a fourth direction relative to said second housing member.

7. The sliding key fob of claim 6 wherein said first housing member is an upper member and said second housing member is a lower member, sliding movement in said first, second, third and fourth directions occurs in a single plane, sliding movement in said first and second directions occurs along a first axis and sliding movement in said third and fourth directions occurs along a second axis that is oriented normal relative to said first axis.

8. The sliding key fob of claim 6 wherein said housing is button-less and each of said first, second, third and fourth actuating signals corresponds to a specific vehicle function.

9. The sliding key fob of claim 1 wherein said first direction and said second direction are disposed along a plane defined by an interface between said first and second housing members.

10. The sliding key fob of claim 1 further including:

a ball member connected to one of said first housing member or said second housing member and a detent defined in the other of said first housing member or said second housing member, said ball member and said detent movable relative to one another when said first housing member is moved relative to said second housing member to provide tactile feedback.

11. The sliding key fob of claim 1 wherein said sliding movement of said first housing member is guided by at least one track to prevent relative rotation between said first housing member and said second housing member.

12. A key fob for a vehicle, comprising:

a lower housing member;

an upper housing member secured to said lower housing member and slidably movable relative thereto, said upper housing member slidably movable along a first axis to a first actuating position and slidably movable along a second axis to a second actuating position, said first axis oriented approximately normal relative to said second axis; and a transmitter received between said lower and upper housing members and configured for transmitting actuating signals to an associated vehicle based upon movement of the upper housing member relative to the lower housing member, said transmitter sending a first actuating signal when said upper housing member is moved to said first actuating position and a second actuating signal when said upper housing member is moved to said second actuating position.

13. The key fob of claim 12 wherein sliding movement of said upper housing member relative to said lower housing member is restricted to a single plane.

14. The key fob of claim 12 wherein said upper housing member includes a ball member operatively connected thereto for sliding movement therewith, and said lower housing member defines a detent within which said ball member is received when said upper housing member is in a non-actuating rest position, said ball member moved out of said detent when said upper housing member is moved into one of said actuating positions and urged back into said detent by a biasing mechanism.

15. The key fob of claim 12 wherein sliding movement along said first axis is guided by at least one track and a biasing mechanism urges said upper housing member along said at least one track toward a non-actuating rest position between said first and second actuating positions, and sliding movement along said second axis is also guided by at least one track toward said non-actuating rest position, which is also between said third and fourth actuating positions.

16. The key fob of claim 12 wherein each of said actuating positions includes a corresponding micro-switch that is actuated when said upper housing member moves to a respective one of said actuating positions, each said micro-switch pivotally disposed on said upper member housing and actuated by a ramp portion of said lower housing.

17. A slide actuated key fob, comprising:

a first clamshell member and a second clamshell member, said first clamshell member slidably movable in at least two directions relative to said second clamshell member, the at least two directions including a first direction and a second direction perpendicular to the first direction; and a transmitter disposed between said first and second clamshell members and adapted to transmit actuating signals based on movement of the first clamshell member, said transmitter sending a first actuating signal when said first clamshell member is moved in a first direction of said at least two directions and sending a second actuating signal when said first clamshell member is moved in a second direction of said at least two directions.

18. The slide actuated key fob of claim 17 further including a micro-switch corresponding to each of said at least two directions, including a first micro-switch corresponding to said first direction and a second micro-switch corresponding to said second direction, said first clamshell member actuating said corresponding micro-switch when said first clamshell member is moved in one of said at least two directions.

19. The slide actuated key fob of claim 17 including a biasing mechanism urging said first clamshell toward a rest position away from said at least two directions.

* * * * *